(12) United States Patent
Benkert et al.

(10) Patent No.: US 9,929,452 B2
(45) Date of Patent: Mar. 27, 2018

(54) ENERGY CONVERSION CELL HAVING AN ELECTROCHEMICAL CONVERSION UNIT

(71) Applicant: SIEMENS AKTIENGESELLSCHAFT, Munich (DE)

(72) Inventors: Katrin Benkert, Schwaig (DE); Sylvio Kosse, Erlangen (DE); Thomas Soller, Deggendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 247 days.

(21) Appl. No.: 14/779,933

(22) PCT Filed: Feb. 24, 2014

(86) PCT No.: PCT/EP2014/053523
§ 371 (c)(1),
(2) Date: Sep. 24, 2015

(87) PCT Pub. No.: WO2014/154406
PCT Pub. Date: Oct. 2, 2014

(65) Prior Publication Data
US 2016/0056518 A1    Feb. 25, 2016

(30) Foreign Application Priority Data
Mar. 27, 2013 (DE) .................. 10 2013 205 407

(51) Int. Cl.
*H01M 12/06* (2006.01)
*H01M 8/1226* (2016.01)
(Continued)

(52) U.S. Cl.
CPC ......... *H01M 12/06* (2013.01); *H01M 4/8605* (2013.01); *H01M 4/8621* (2013.01);
(Continued)

(58) Field of Classification Search
CPC ............ H01M 8/0245; H01M 8/1213; H01M 8/1226; H01M 12/06
(Continued)

(56) References Cited

U.S. PATENT DOCUMENTS

2003/0143457 A1* 7/2003 Kashino ................ H01M 4/242
429/137
2012/0040254 A1* 2/2012 Amendola ............ C25B 11/035
429/406
(Continued)

FOREIGN PATENT DOCUMENTS

DE    10 2013 205 407.6    3/2013
WO         2013/104615 A1    7/2013
WO    PCT/EP2014/053523    2/2014

OTHER PUBLICATIONS

International Search Report dated Jun. 18, 2014 in related International Application No. PCT/EP2014/053523, two pages.

*Primary Examiner* — Basia Ridley
*Assistant Examiner* — James Erwin
(74) *Attorney, Agent, or Firm* — Slayden Grubert Beard PLLC

(57) ABSTRACT

An energy conversion cell includes an electrochemical conversion unit. The energy conversion cell has an electrically positive side with a process gas supply and an electrically negative side. The electrochemical conversion unit, which has a self-supporting substrate and a number of functional layers, is disposed between the two sides. The electrochemical conversion unit has a positive electrode and a negative electrode. The negative electrode includes a porous metallic, self-supporting substrate.

10 Claims, 3 Drawing Sheets

(51) Int. Cl.
| | |
|---|---|
| *H01M 8/1213* | (2016.01) |
| *H01M 4/86* | (2006.01) |
| *H01M 8/0232* | (2016.01) |
| *H01M 8/0245* | (2016.01) |
| *H01M 12/08* | (2006.01) |
| *H01M 4/90* | (2006.01) |

(52) U.S. Cl.
CPC ....... *H01M 8/0232* (2013.01); *H01M 8/0245* (2013.01); *H01M 8/1213* (2013.01); *H01M 8/1226* (2013.01); *H01M 12/08* (2013.01); *H01M 4/905* (2013.01); *H01M 2300/0082* (2013.01)

(58) Field of Classification Search
USPC ........................................................ 429/405
See application file for complete search history.

(56) References Cited

U.S. PATENT DOCUMENTS

2012/0058396 A1   3/2012  Lu et al.
2012/0270088 A1   10/2012 Huang et al.

* cited by examiner

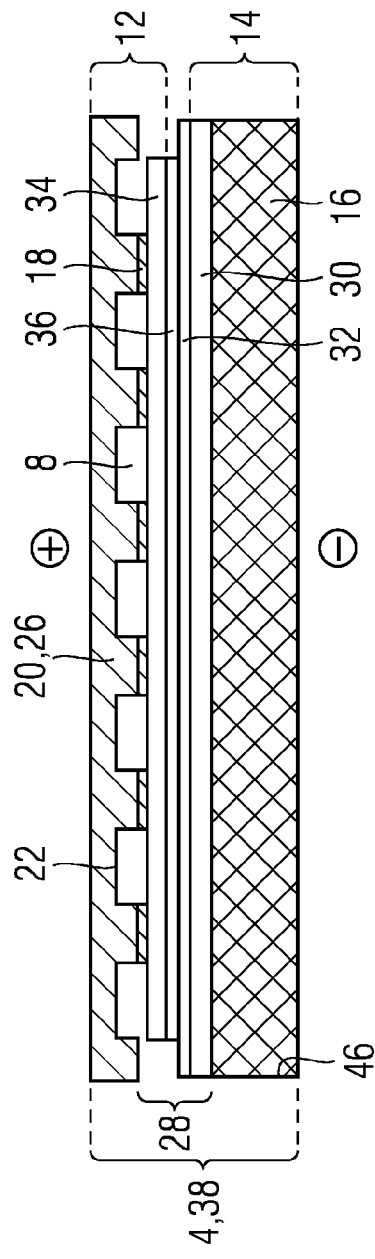
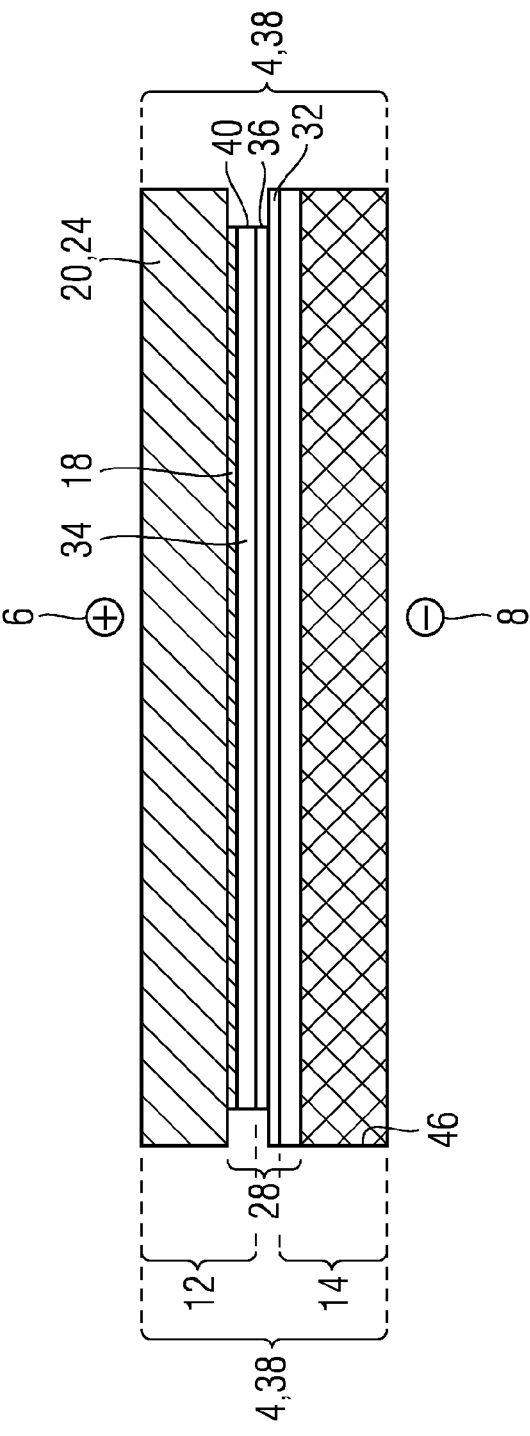

ENERGY CONVERSION CELL HAVING AN ELECTROCHEMICAL CONVERSION UNIT

CROSS REFERENCE TO RELATED APPLICATIONS

This application is based on and hereby claims priority to International Application No. PCT/EP2014/053523 filed on Feb. 24, 2014 and German Application No. 10 2013 205 407.6 filed on Mar. 27, 2013, both applications are incorporated by reference herein in their entirety.

BACKGROUND

Rechargeable solid electrolyte metal-air batteries, and also fuel cells of the SOFC type, include ceramic basic elements such as a zirconium oxide-electrolyte layer and oxide ceramics as cathodes and anodes or as positive or negative electrodes. The combination of oxide ceramic electrodes and solid state electrolytes is referred to here as a so-called membrane electrode assembly (MEA) and enables the conversion of electrical energy into chemical energy and vice-versa. A redox pair of metal and metal oxide, such as, for example, iron and iron oxide in various stages of oxidation or nickel and nickel oxide, is used for storing the energy in the solid electrolyte-metal-air battery. Here the oxygen is brought from the negative electrode to the surface of the storage medium by a gaseous redox pair, in the simplest case $H_2/H_2O$. A fundamental problem of such described batteries, and also of other energy conversion cells that rely on the rather brittle oxide ceramic MEA structures, is the electrical contacting of the MEAs in each case, because the oxide ceramic electrolyte layer only has low conductivity and current carrying capacity. In addition, such MEA structures are relatively brittle, and excessive internal stresses can occur within the MEA when assembling a plurality of energy conversion cells into stacks with small manufacturing tolerances. However, the described structure can only be electrically tested regarding its electrical properties in the assembled state.

SUMMARY

In one aspect, energy conversion cell is provided, in particular an energy storage cell, having reduced cost of manufacture compared to the related art, in which no-load assembly of the MEA is possible and the electrical properties of the MEA can be checked before assembly.

In one aspect, an energy conversion cell is provided that has an electrochemical conversion unit.

The energy conversion cell may have an electrochemical conversion unit including an electrically positive side having a process gas feed as well as an electrically negative side. The electromechanical conversion unit is disposed between the two sides. The electrochemical conversion unit includes a self-supporting substrate and a plurality of functional layers. The conversion unit is characterized in that it includes a positive electrode and a negative electrode and in that the negative electrode contains a porous, metallic self-supporting substrate.

The conversion unit described here may be based on the already described membrane electrode assembly (MEA), but may differ from the usual MEAs in that the self-supporting substrate, which also includes a MEA, is formed by a porous, metallic, self-supporting body. In particular an iron-based alloy or a nickel-based alloy may be used as the material for this. Other alloys that are suitably temperature and oxidation resistant can also be used. This is a supporting structure, i.e. a self-supporting substrate, which is electrically conductive at the same time, which makes contacting of the MEA, as is necessary in the related art, unnecessary. The electrons are discharged laterally through the porous metallic self-supporting substrate and laterally introduced into a circuit by integration of the current drain within a membrane-electrode assembly.

In contrast to a known MEA, the electrochemical conversion unit thus has integrated contacting at the same time, so that the contacting quality and the electrical properties of the conversion unit can be tested before the assembly of the entire energy conversion cell. Because the contacting in the design does not have to be carried out by inflexible housing parts of the energy conversion cell, no-load assembly of the conversion unit is also possible. In addition, the brittleness of the conversion unit is reduced compared to a known MEA if a metallic substrate that has higher ductility compared to the known ceramic oriented substrates can be used as the supporting substrate for the other functional layers.

In a further embodiment, the positive electrode includes a contact layer, with which contact is made with a self-supporting electrically conductive layer. The negative electrode may contain a self-supporting substrate, and the positive electrode may be provided as a self-supporting layer that can be designed monolithically, such as in the form of a plate, but which can also be designed as with the negative electrode in the form of a porous metallic material. A lateral outflow of electrons can thus also take place via the positive electrode, wherein contacting the circuit can be carried out laterally from the conversion unit, which is of a planar design.

The self-supporting electrically conductive layer of the positive electrode may be provided with an additional protective layer against oxidation.

The self-supporting substrate of the negative electrode and the functional layers, as well as possibly the self-supporting layer of the positive electrode, may be firmly bonded to each other. The substrates thus form a closed, firmly bonded unit about the mentioned layers, which can basically be tested for electrical and mechanical capacities before installation in an energy conversion cell.

The electrochemical conversion unit may include a layer combination that is configured as follows. The following functional layers may be disposed on the porous metallic self-supporting substrate in the stated sequence: first a functional layer follows the negative electrode, an electrolyte layer, in particular of a solid state electrolyte, such as based on yttrium boosted zirconium oxide, then follows a functional layer of the positive electrode as well as the contact layer and then the self-supporting electrical layer of the positive electrode, which, as already mentioned, can be in the form of a plate, of a mesh or even in the form of a porous substrate similar to the substrate in the negative electrode. A diffusion barrier layer can also be disposed between the electrolyte layer and the functional layer of the positive electrode, the diffusion barrier layer preventing ions from diffusing from the electrolyte layer into the functional layer of the positive electrode. The sequence of layers constitutes an embodiment, but further functional layers that are not mentioned here can be added.

A multi-layer stack that may be formed by the self-supporting substrate as well as by the functional layers and possibly by the electrically conductive self-supporting layer of the positive electrode and which is a significant component of the unit, includes an at least partly circumferential groove, in which a seal can be inserted during assembly of the conversion unit, the seal protruding above the described groove. The seal is mounted in a further groove of the energy conversion cell in an interconnector plate, thus reducing a mechanical load on the conversion unit.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 is a side view of an electrochemical conversion unit;

FIG. 3 is a plan view of an electrochemical conversion unit;

DETAILED DESCRIPTION OF THE PREFERRED EMBODIMENT

Figure 1:
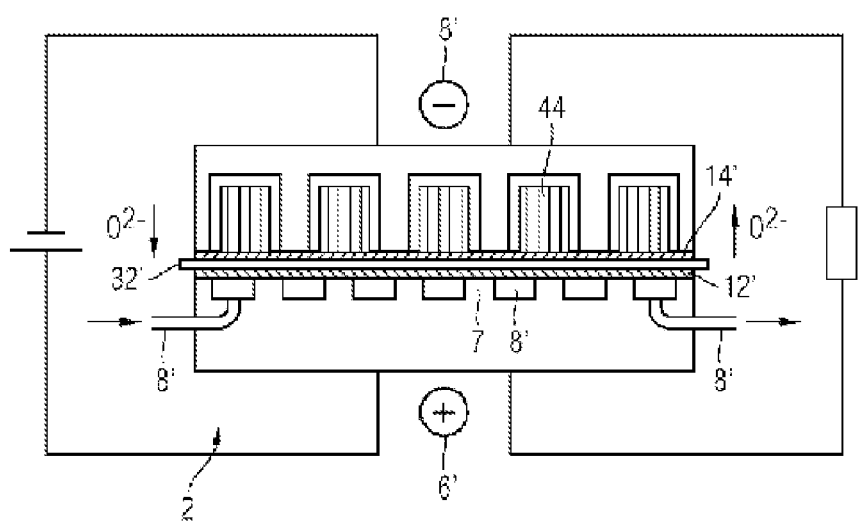
FIG. 1 is a schematic representation of a solid electrolyte-metal-air battery.

Further advantageous embodiments as well as further features are described in detail below, the same features in different embodiments being provided during this with the same reference characters. Features from the related art with the same designation are provided with the same reference characters as for the description of the embodiments, the reference characters having an additional appended dash.

Referring to FIG. 1 (which belongs to the related art), first the operation of a solid electrolyte-metal-air battery (also Rechargeable Oxide Battery (ROB)) will be described schematically to the extent that is necessary for the present description. A usual structure of a ROB is that a process gas, in particular air, is blown in by a gas feed 8' onto a positive electrode 12', which is also referred to as an air electrode, wherein oxygen is extracted from the air during discharging (circuit on the right side of the image). The oxygen passes in the form of oxygen ions $O^{2-}$ through a solid state electrolyte 32' (electrolyte layer) in contact with the positive electrode to a negative electrode 14'. The negative electrode is connected to the porous storage medium by a gaseous redox pair, such as a hydrogen-water vapor mixture. If there were to be a dense layer of the active storage material present on the negative electrode 14', then the charge capacity of the battery would be rapidly exhausted.

A storage structure 2 of porous material may be installed on the negative electrode as an energy storage medium containing a functionally active oxidisable material as a storage medium 44', such as in the form of iron and iron oxide.

Oxygen ions transported through the solid state electrolyte 32' following their discharge at the negative electrode are transported in the form of water vapor through porous channels of the storage medium 44' by a redox pair that is gaseous during the operating state of the battery, such as $H_2/H_2O$. Depending on whether a discharge or charging process is in progress, the metal or the metal oxide (iron/iron oxide) is oxidized or reduced and the oxygen required for this is provided by the gaseous redox pair $H_2/H_2O$ or is transported back to the solid state electrolytes. The mechanism of the oxygen transport by a redox pair is referred to as a shuttle mechanism.

The advantage of iron as the oxidisable material, i.e. as the storage medium 44', is that during its oxidation process it has about the same open-circuit voltage of about 1 V as the redox pair $H_2/H_2O$ for a partial pressure ratio of 1, otherwise an increased resistance results for the oxygen transport through the diffusing components of the redox pair.

The diffusion of the oxygen ions through the electrolyte layer 32' requires a high operating temperature of 600 to 800° C. of the described ROB, but the temperature range may also promote the optimum composition of the redox pair $H_2/H_2O$ in equilibrium with the storage material. Not only is the structure of the electrodes 12',14' and the electrolyte layer 32' exposed to a high thermal load here, but also the storage medium 44'. During the continuous cycles of oxidation and reduction, the active storage material tends to sinter, which means that the individual granules melt together ever more owing to the diffusion processes, the reactive surface lowers and the continuous open pore structure required for the gas transport disappears. With a closed pore structure, the redox pair $H_2/H_2O$ can no longer reach the active surface of the storage medium 44', so that the internal impedance of the battery is already very high after a partial discharge of the storage device, which prevents further technically meaningful discharging.

An advantage of the ROB is that it is expandable in a modular fashion almost without limit owing to its smallest unit, namely the storage cell. As a result a small battery for static domestic use can also be represented as well a large-scale system for storing the energy of a power plant.

A highly simplified schematic representation is shown in FIG. 1 only regarding the positive electrode 12', the electrolyte structure 32' and the negative electrode 14'. This is normally a layered structure in the related art, the layered structure includes a ceramic substrate, which, for example, is based on yttrium-augmented zirconium oxide. The very brittle substrate must be electrically contacted both on the positive side 6' and also on the negative side 8' of the energy conversion cell. On the negative side 8' the contacting is carried out, for example, by an electrically conductive mesh (not shown here), which is inserted between the negative electrode 14' and the storage medium 44'. On the positive side 6' the contacting is carried out using webs 7' that separate the channels of the air feed device 8' from each other. With the contacting method there is a multiple static indeterminate mechanical load acting on the electrode structure, in addition there is a contacting structure that can only be electrically tested in the assembled state of the energy conversion cell, here in the form of the metal-air battery.

Shown in FIG. 2 is an example an electrochemical conversion unit 4 (called a conversion unit 4 below) that has a porous metallic framework as a self-supporting substrate 16 that is a component of a negative electrode 14. The porous ceramic framework that forms the substrate 16 can, for example, be configured in the form of a metallic foam. A nickel-based alloy or iron-based alloy, for example, can be provided here as the material, being essentially inert at the described high process temperatures of the metal-air battery.

A functional layer 30 of the negative electrode 14 is applied to the substrate 16. The functional layer 30 together with the substrate 16 forms the negative electrode 14. An electrolyte layer 32, containing a solid state electrolyte based on yttrium-augmented zirconium oxide, follows on the layer 30. In order to avoid the diffusion of ions from the electrolyte layer, a diffusion barrier layer 36 is provided, being disposed between the electrolyte layer 32 and a functional layer 34 of the positive electrode 12. A contact layer 18 is applied on the functional layer 34 of the positive electrode 12, the contact layer 18 making the contact to a self-supporting layer 20 of the positive electrode 12. The self-supporting layer 20 according to FIG. 2 is a monolithic metallic structure, such as in the form of a metallic plate. The self-supporting layer 20 may be enveloped by a protective layer 22, which in particular acts as an oxidation protection layer.

The self-supporting layer 20, possibly its protective layer 22, the contacting layer 18 as well as the functional layer 34 of the positive electrode 12 together form the positive electrode 12 according to the representation. With the embodiment, the self-supporting layer 20 is designed such that channels form that are part of the process gas feed 8. The oxygen passes through the channels to the functional layer of the positive electrode 12 and on across the electrolyte layer 32 to the negative electrode 14, as has already been described by way of introduction.

The functional layer 34 of the positive electrode 12, the electrolyte layer 32, the diffusion layer 36 as well as the functional layer 30 of the negative electrode 14 together form the already mentioned functional layers, which by themselves have a relatively small thickness, which is usually between 10 μm and 50 μm. Because the layers are not self-supporting, they are applied to the self-supporting substrate 16. The metallic, porous, electrically conductive self-supporting substrate 16 differs from the related art in that a ceramic-based, non-electrically conductive monolithic substrate is used there in each case. Owing to the described structure the electrodes can flow out in a planar manner through the substrate 16 and are fed into a circuit via a lateral current drain 46.

The structure according to FIG. 3 only differs from the structure according to FIG. 2 in that a porous metallic body 24 is used as a self-supporting layer 20 of the positive electrode, which can in principle have similar properties to the substrate 16 of the negative electrode. The porous metallic body 24 is different from the monolithic metallic body 26 according to FIG. 2, being air permeable, which results in the channels of the air feed 8 being dispensable. The porous metallic body 24 can thus be applied to the contact layer 18 throughout, recesses in the form of channels being unnecessary here.

The layered structure shown in FIGS. 2 and 3 of the individual functional layers as well as substrates, which together form the firmly bonded electrochemical conversion unit 4, can also be referred to as a multi-layer stack 38. The multi-layer stack 38 can be configured such that different layers, shown here by way of example as the contacting layer 18, the diffusion layer 36 as well as the functional layer 34 of the positive electrode 12 and possibly also regions of the self-supporting layer 20 as well as the substrate 16 of a smaller area, extend further than the usual layers, which results in a circumferential groove 40 that is in particular suitable for the insertion of seal 42 therein.

Figure 4:
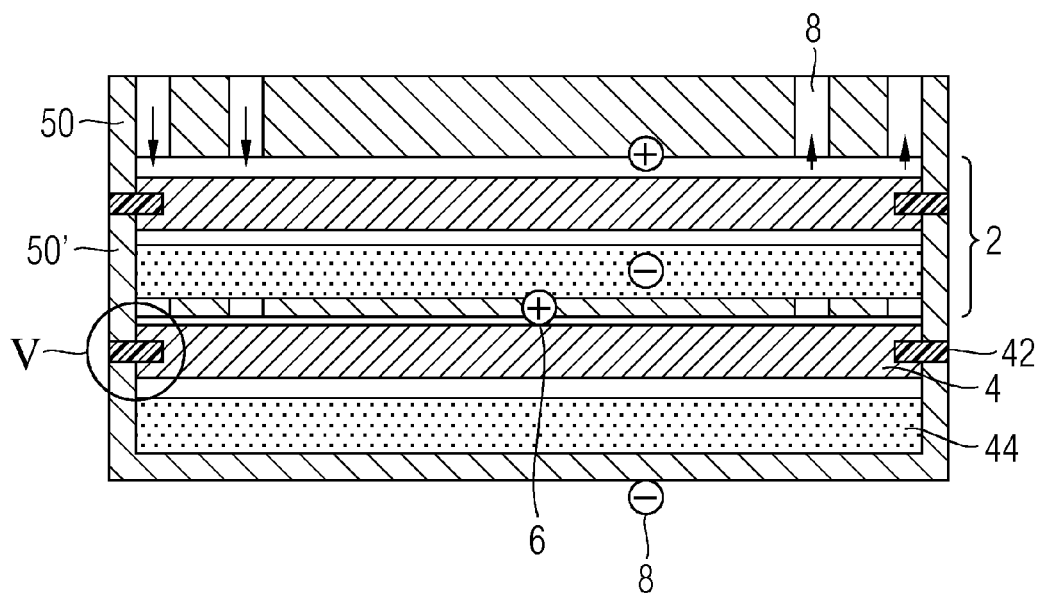
FIG. 4 is a side view of an energy conversion cell with an electrochemical conversion unit in the installed position.
Figure 5:
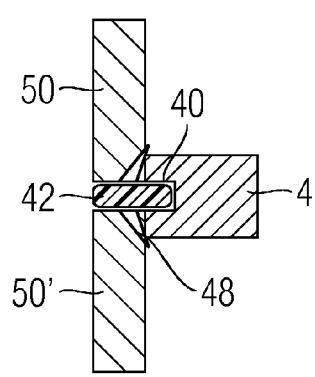
FIG. 5 is an enlarged representation of section V in FIG. 4.

In FIG. 4 an installed position of a multilayer stack 38 from FIG. 2 or 3 is shown in an energy conversion cell 2, in particular a cell of a metal-air battery. The cell 2 includes housing plates 50 and 50' here (also interconnector plates) having corresponding recesses for the electrochemical conversion unit 4, a storage medium 44 also being introduced into the recesses, wherein the exact arrangement will not be discussed in detail at this point. However, the arrangement of the seal 42 should be discussed here, the seal being inserted between the housing parts 50 and 50' of the cell 2 on the one hand, and in turn protruding into the groove 40 of the conversion unit. The conversion unit 4 is thus supported by the seal 42 inserted in the groove 40, wherein it should be mentioned here that hardly any mechanical stresses act upon the conversion unit 4, owing to which the lateral contacting 46 with the housing part 50 and 50' already described according to FIGS. 2 and 3 may occur. Substantial mechanical decoupling of the MEA from the cell 2 can thus take place with good contacting at the same time. In FIG. 5 is shown an enlarged representation of the section V in FIG. 4, where the arrangement of the seal 42 can be clearly seen, as it protrudes into the groove 40 of the conversion unit 4. A joint 48, such as a weld seam or a solder joint, may be provided between the conversion unit 4 and the housing part 50, 50'.

Besides the already mentioned separate testability of the integrated conversion unit 4, which in particular concerns the contacting quality of the individual components, and the no-load assembly that results in significantly improved mechanical stability of the entire structure, it should also be mentioned that owing to the described cell and the described conversion unit 4 the cost of manufacture of a stack consisting of different cells 2 is very much reduced. This in turn leads to a clearly simpler design of the housing parts 50, 50', i.e. the so-called interconnector plates. As a result the volume available for the storage medium 44 is increased, which in turn results in a higher energy density as well as the reduction of the costs per stack.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. An energy conversion cell having an electrically positive portion that receives process gas, an electrically negative portion, and an electrochemical conversion unit disposed between the electrically positive portion and the electrically negative portion, the electrochemical conversion unit comprising:
   a positive electrode having a positive electrode functional layer and a self-supporting electrically conductive layer;
   a negative electrode having a negative electrode functional layer disposed on a porous metallic self-supporting substrate; and
   an electrolyte layer disposed on the negative electrode functional layer opposite the porous metallic self-supporting substrate;
   a diffusion barrier layer disposed on the electrolyte layer opposite the negative electrode functional layer the diffusion barrier layer blocking diffusion of ions from the electrolyte layer to the positive electrode functional layer;
   the positive electrode functional layer disposed on the diffusion barrier layer opposite the electrolyte layer;
   a contact layer disposed on the positive electrode functional layer opposite the diffusion barrier layer; and
   the self-supporting electrically conductive layer disposed on the contact layer opposite the positive electrode functional layer.

2. The energy conversion cell as claimed in claim 1, wherein the positive electrode is formed by the positive electrode functional layer, the contact layer and the self-supporting electrically conductive layer.

3. The energy conversion cell as claimed in claim 2, wherein the self-supporting electrically conductive layer includes a protective layer.

4. The energy conversion cell as claimed in claim 3, wherein the self-supporting electrically conductive layer further includes a porous metallic body.

5. The energy conversion cell as claimed in claim 3, wherein the self-supporting electrically conductive layer further includes a planar monolithic metallic body.

6. The energy conversion cell as claimed in claim 2, wherein the self-supporting electrically conductive layer includes a porous metallic body.

7. The energy conversion cell as claimed in claim 2, wherein the self-supporting electrically conductive layer includes a planar monolithic metallic body.

8. The energy conversion cell as claimed in claim 1, wherein the porous metallic self-supporting substrate and the functional layers are fixedly bonded to each other.

9. The energy conversion cell as claimed in claim 1, wherein the porous metallic self-supporting substrate, the functional layers, and the self-supporting electrically conductive layer are disposed in a planar manner to form a multi-layer stack, the multi-layer stack including a circumferential groove.

10. The energy conversion cell as claimed in claim 1, wherein the porous metallic self-supporting substrate is an alloy selected from the group consisting of an iron-based alloy and a nickel-based alloy.

\* \* \* \* \*